(12) United States Patent
Kim et al.

(10) Patent No.: US 12,300,982 B2
(45) Date of Patent: May 13, 2025

(54) CABLE MOLD

(71) Applicant: Seong-jun Kim, Siheung-si (KR)

(72) Inventors: Seong-jun Kim, Siheung-si (KR);
Sung-shik Kim, Gwangmyeong-si (KR)

(73) Assignee: Seong-Jun Kim (KR)

( * ) Notice: Subject to any disclaimer, the term of this patent is extended or adjusted under 35 U.S.C. 154(b) by 72 days.

(21) Appl. No.: 18/117,635

(22) Filed: Mar. 6, 2023

(65) Prior Publication Data
US 2023/0208117 A1 Jun. 29, 2023

Related U.S. Application Data

(63) Continuation of application No. PCT/KR2021/011428, filed on Aug. 26, 2021.

(30) Foreign Application Priority Data

Sep. 9, 2020 (KR) .................. 10-2020-0115717
Nov. 3, 2020 (KR) .................. 10-2020-0145542

(51) Int. Cl.
H02G 3/04 (2006.01)
H02G 3/00 (2006.01)

(52) U.S. Cl.
CPC .............. *H02G 3/0418* (2013.01); *H02G 3/26* (2013.01)

(58) Field of Classification Search
None
See application file for complete search history.

(56) References Cited

U.S. PATENT DOCUMENTS 5,587,556 A * 12/1996 Yamamoto ............... H01R 4/22
174/92
2007/0007029 A1* 1/2007 Suzuki ................ B60R 16/0215
174/68.1

(Continued)

FOREIGN PATENT DOCUMENTS

EP 0414616 A1 * 2/1991
JP H0670415 U * 9/1994

(Continued)

OTHER PUBLICATIONS

Korean Office Action (KR 10-2020-0115717), KIPO, Jan. 4, 2021.
(Continued)

*Primary Examiner* — Krystal Robinson
(74) *Attorney, Agent, or Firm* — Park & Associates IP Law Office

(57) ABSTRACT

The present invention relates to a cable mold for organizing and protecting indoor cable such as an electric wire or communication wire, and specifically, provides a cable mold comprising: a bottom part tightly adhering to a floor and receiving cable on top of the bottom part; a cover part for covering the upper side of the bottom part, and receiving the cable under the cover part; a connection part for integrally connecting the respective one-side front ends of the bottom part and cover part, and enabling the cover part to open and close; lock parts each correspondingly formed on the respective other-side front ends of the bottom part and cover part so as to be capable of being fastened to and separated from each other; and an opening/closing means part formed on the other side of the bottom part or cover part so as to enable the cover part to be opened. Thus, the cover part may be opened/closed more smoothly and stably, and at the same time, may be easily opened by hand.

7 Claims, 17 Drawing Sheets

(56) References Cited

U.S. PATENT DOCUMENTS

| | | | | |
|---|---|---|---|---|
| 2012/0217033 A1* | 8/2012 | Agusa | ................. | B60R 16/0215 |
| | | | | 174/68.3 |
| 2013/0206447 A1* | 8/2013 | Iio | ........................... | H02G 3/38 |
| | | | | 174/68.3 |
| 2019/0351846 A1* | 11/2019 | Matsuyama | ........ | B60R 16/0215 |

FOREIGN PATENT DOCUMENTS

| KR | 2019920013860 U | 7/1992 |
|---|---|---|
| KR | 200208554 Y1 | 1/2001 |
| KR | 200273473 Y1 | 4/2002 |
| KR | 200284479 Y1 | 8/2002 |
| KR | 200377098 Y1 | 3/2005 |
| KR | 1020080079367 A | 9/2008 |
| KR | 1020080109419 A | 12/2008 |
| KR | 1020080112043 A | 12/2008 |
| KR | 100884717 B1 | 2/2009 |
| KR | 102087284 B1 | 3/2020 |
| KR | 1020200118538 A | 10/2020 |

OTHER PUBLICATIONS

Korean Office Action (KR 10-2020-0145542), KIPO, Mar. 9, 2021.
Korean Notice of Allowance (KR 10-2020-0115717), KIPO, May 18, 2021.
Korean Notice of Allowance (KR 10-2020-0145542), KIPO, Jul. 14, 2021.
International Search Report (PCT/KR2021/011428), WIPO, Dec. 24, 2021.

* cited by examiner

CABLE MOLD

REFERENCE TO RELATED APPLICATIONS

This is a continuation of International Patent Application PCT/KR2021/011428 filed on Aug. 26, 2021, which designates the United States and claims priority of Korean Patent Application No. 10-2020-0115717 filed on Sep. 9, 2020, and Korean Patent Application No. 10-2020-0145542 filed on Nov. 3, 2020, the entire contents of which are incorporated herein by reference.

FIELD OF THE INVENTION

The present invention relates to a cable mold for organizing and protecting cables such as indoor electric wires or communication lines.

BACKGROUND OF THE INVENTION

When home appliances or electronic devices are installed in indoor places such as offices or households, cables such as electric wires or communication lines are connected thereto through floors or walls. Therefore, a cable mold is used as a means for organizing and protecting the cables so that the cables are not exposed.

As a conventional embodiment of the cable mold, Korean Utility Model Laid-Open Publication No. 20-2000-0009569 (published on Jun. 5, 2000) discloses ˹an electric wire protection mold having a shielding space formed therein so as to be elongated in a longitudinal direction to accommodate an electric wire in the shielding space, thereby shielding and protecting the electric wire from the outside, the electric wire protection mold including a base portion, which has a strap shape having a predetermined width and a length greater than the width and has a sheet of double-sided adhesive tape adhered to the lower surface thereof, two opposite flange portions, which extend in a partition plate shape from both sides of the base portion to a predetermined height, a cover portion, which extends from the upper end of one of the flange portions in a horizontal direction so as to elastically pivot about one of the flange portions and has a fitting protrusion formed on a free end thereof so as to be fitted into a fitting groove formed in the upper end of the other of the flange portions in an interference-fit manner, thereby forming a shielding space for protecting the electric wire between the base portion and the two opposite flange portions, and a thin-wall portion, which is formed to a relatively small thickness as a connection portion between one of the flange portions and the cover portion, wherein the base portion, the flange portions, the cover portion, and the thin-wall portion are integrally formed with each other˼.

Such a conventional electric wire protection mold has ˹an advantage in that it is very simple to mount and it is very convenient to manage because the base portion and the cover portion are made of a synthetic resin material in an integral form˼, as described in the specification, but has the following disadvantages in use.

First, it is difficult to open the cover portion. In some cases, even after an electric wire is laid using the electric wire protection mold, the electric wire may be removed from the electric wire protection mold or an additional electric wire may be introduced into the electric wire protection mold as needed. In order to open the cover portion 12 to remove the electric wire from or to put an additional electric wire into the electric wire protection mold, it is necessary to increase a gap between the cover portion and the other flange portion. In this case, however, it is difficult to increase the gap with the hands without using a tool because the gap is small.

Second, the thin-wall portion is formed through a thickness reduction process as a connection portion between one of the flange portions and the cover portion. However, if the thickness of the thin-wall portion 16 is increased to a certain extent in order to improve the durability thereof, the cover portion becomes so stiff that opening and closing thereof are not smoothly realized, thus making it difficult to completely open the cover portion, and if the thickness of the thin-wall portion is reduced to a certain extent, the thin-wall portion is easily torn.

Third, in general, a cable mold is mounted so as to be in close contact with a wall, a floor, or a ceiling, as shown in FIG. 1. In this case, however, when wiring work is performed, there is inconvenience in that the cover portion 12 is not easily opened because the cover portion interferes with the wall before being sufficiently opened.

SUMMARY OF THE INVENTION

The present invention provides a cable mold capable of ensuring more smooth and stable opening and closing of a cover portion and enabling a user to open and close the cover portion more conveniently.

The present invention provides a cable mold configured to be spaced a predetermined distance from a wall when mounted on an edge of a floor and to be spaced a predetermined distance from another cable mold when two or more cable molds are mounted in parallel.

The present invention provides a cable mold capable of covering a gap between a front end of one cable mold and a rear end of another cable mold, which are disposed so as to be in contact with each other or are disposed at a right angle relative to each other.

The present invention includes a bottom portion configured to be brought into close contact with a floor and to accommodate a cable disposed thereon, a cover portion configured to cover an upper side of the bottom portion to accommodate the cable disposed thereunder, a connection portion integrally connecting one side end of the bottom portion to one side end of the cover portion to allow the cover portion to be opened and closed about the side end thereof, locking portions formed on the opposite side end of the bottom portion and the opposite side end of the cover portion so as to be coupled to and separated from each other, and an opening/closing portion formed on the opposite side end of the bottom portion or the opposite side end of the cover portion to enable opening of the cover portion.

The connection portion is integrally formed with the bottom portion and the cover portion, and is made of a synthetic resin material having soft properties so as to be easily bent.

The locking portions include a coupling groove and a coupling protrusion formed corresponding to the coupling groove so as to be fitted into the coupling groove. The coupling groove and the coupling protrusion include snap protrusions formed on contact surfaces thereof so as to be caught by each other. The coupling groove has a clearance space defined therein to allow the coupling protrusion to be pushed thereto when fitted into or separated from the coupling groove.

The opening/closing portion is formed in a shape of a groove depressed in an inward direction or a shape of a protrusion protruding in an outward direction.

The bottom portion includes a wing portion formed on each of both sides thereof, and the wing portion has a predetermined width.

The bottom portion has guide grooves formed in both sides thereof. The cable mold includes a connection member configured to cover both sides of the bottom portion and the cover portion, and the connection member has guide protrusions formed on both sides thereof so as to be fitted into the guide grooves.

The connection member is formed so as to be bent in a horizontal direction or a vertical direction or to have branch portions extending in at least three directions selected from among a forward direction, a backward direction, a leftward direction, a rightward direction, an upward direction, and a downward direction.

According to the cable mold of the present invention, opening and closing of the cover portion are realized more softly, stably, and easily, and therefore use convenience of the cable mold is further improved.

Since the cable mold of the present invention is configured to be spaced a predetermined distance from a wall, a floor, or a ceiling when mounted thereon and to be spaced a predetermined distance from another cable mold when two or more cable molds are mounted in parallel, use convenience thereof is further improved.

When the cable molds of the present invention are mounted, a gap between a front end of one cable mold and a rear end of another cable mold, which are disposed so as to be in contact with each other or are disposed at a right angle relative to each other, is covered, whereby a cable is protected more reliably and is organized neatly.

DETAILED DESCRIPTION OF THE INVENTION

Preferred embodiments of the present invention will be described in detail with reference to the accompanying drawings.

Figure 2:
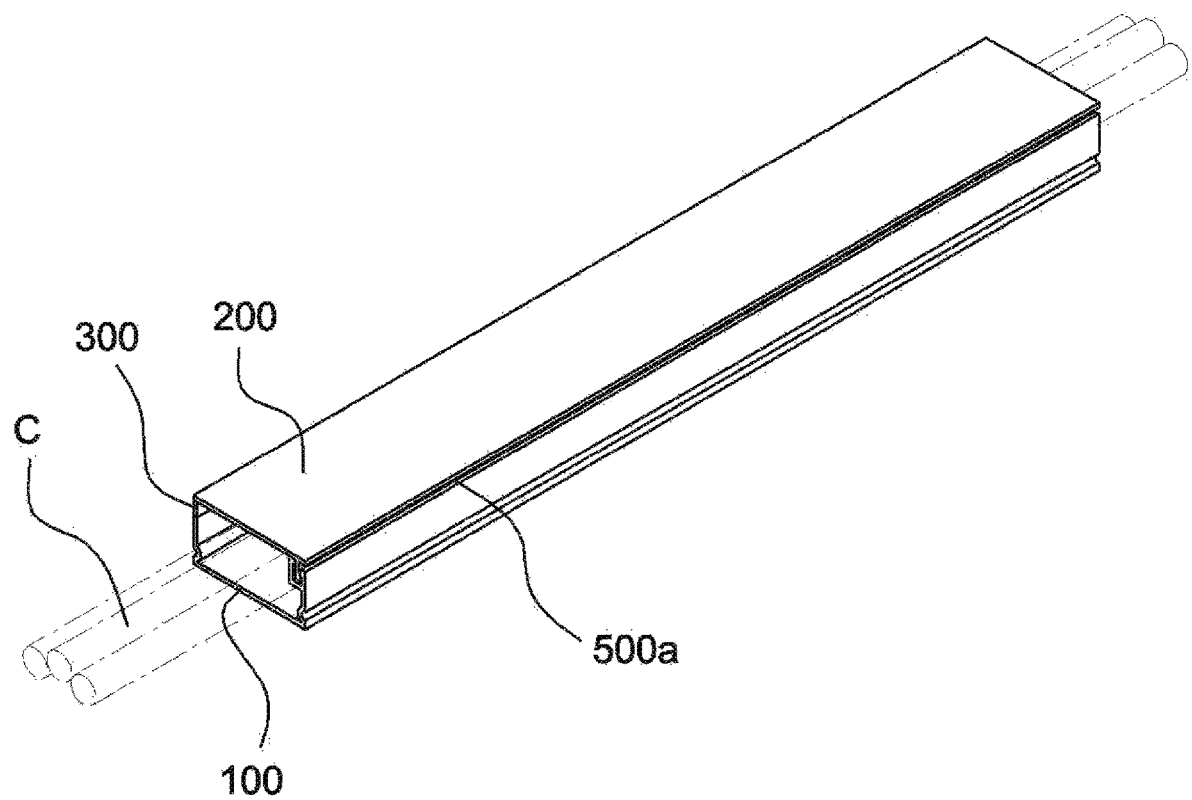
FIG. 2 is a view showing an external appearance of an embodiment of a cable mold to which the present invention is applied.
Figure 3:
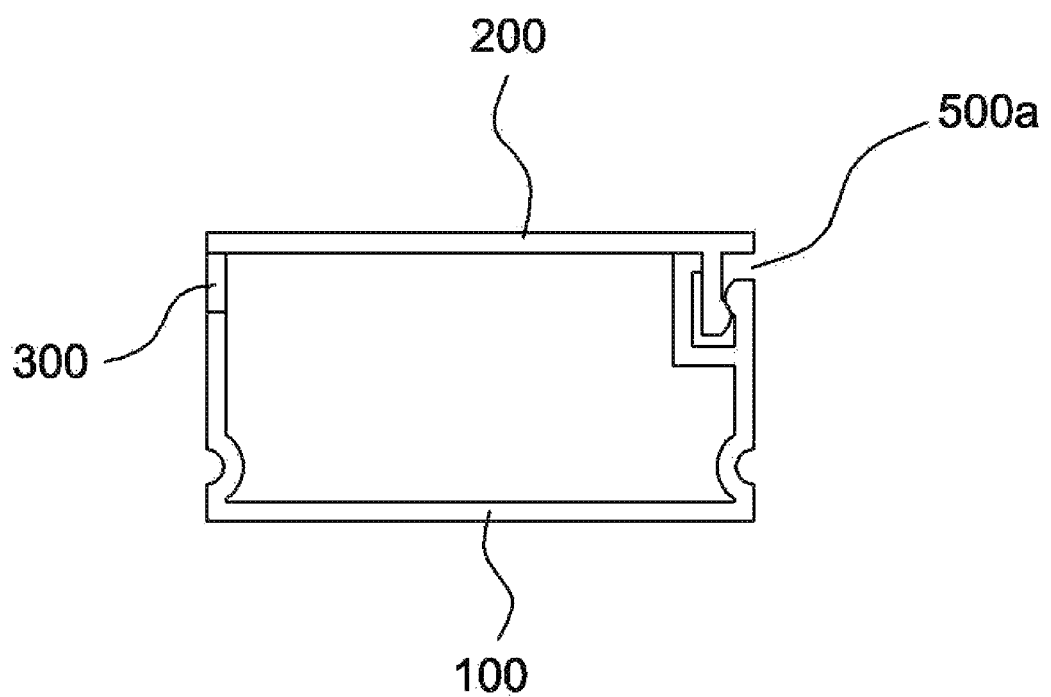
FIGS. 3 to 9 are views for explaining main portions of embodiments of a cable mold to which the present invention is applied.
Figure 4:
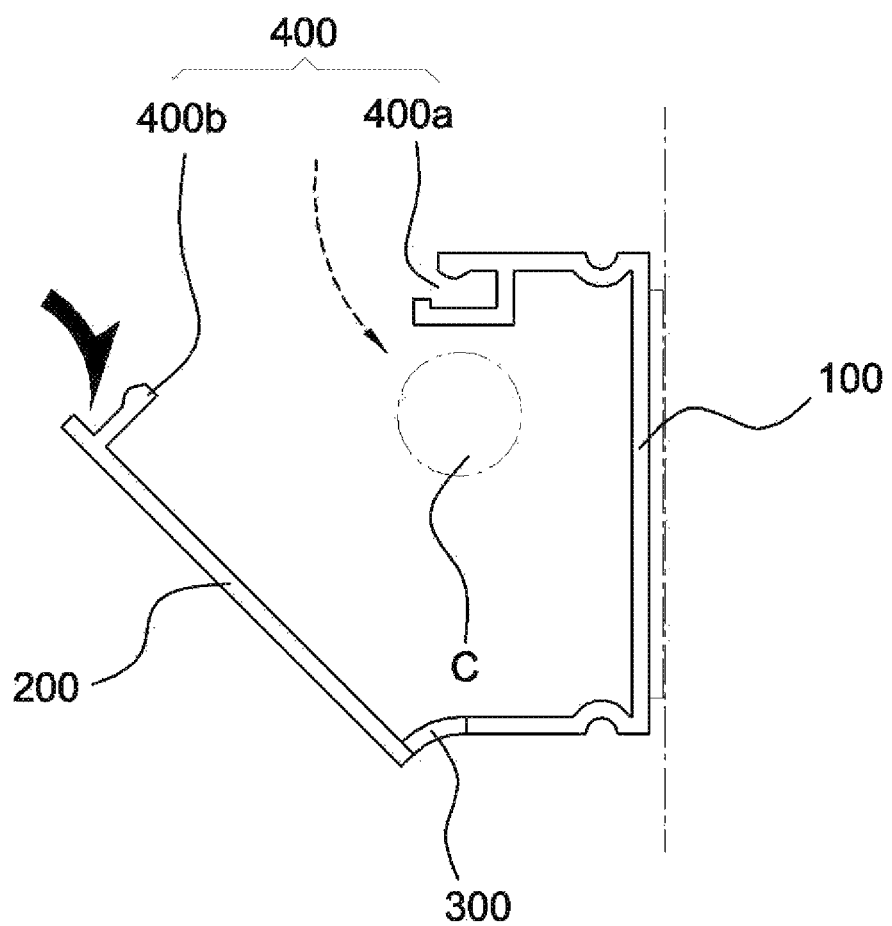

As shown in FIGS. 2 to 4, a cable mold of the present invention includes a bottom portion 100 configured to be brought into close contact with a floor and to accommodate a cable disposed thereon, a cover portion 200 configured to cover the upper side of the bottom portion to accommodate the cable disposed thereunder, a connection portion 300 integrally connecting one side end of the bottom portion to one side end of the cover portion to allow the cover portion to be opened and closed about the side end thereof, locking portions 400 formed on the opposite side end of the bottom portion and the opposite side end of the cover portion so as to be coupled to and separated from each other, and an opening/closing portion 500a or 500b formed on the opposite side end of the bottom portion or the opposite side end of the cover portion to facilitate opening of the cover portion.

Figure 5:
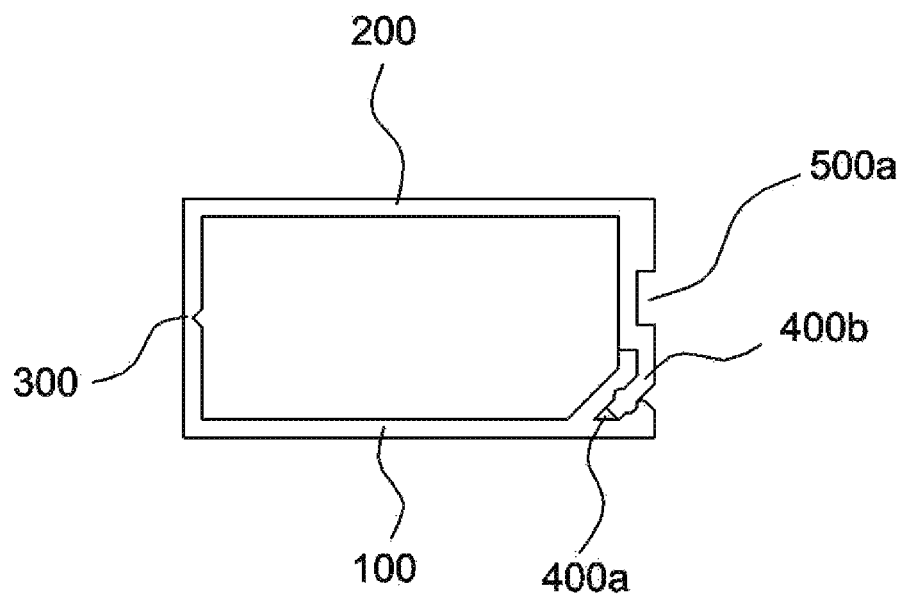
Figure 6:
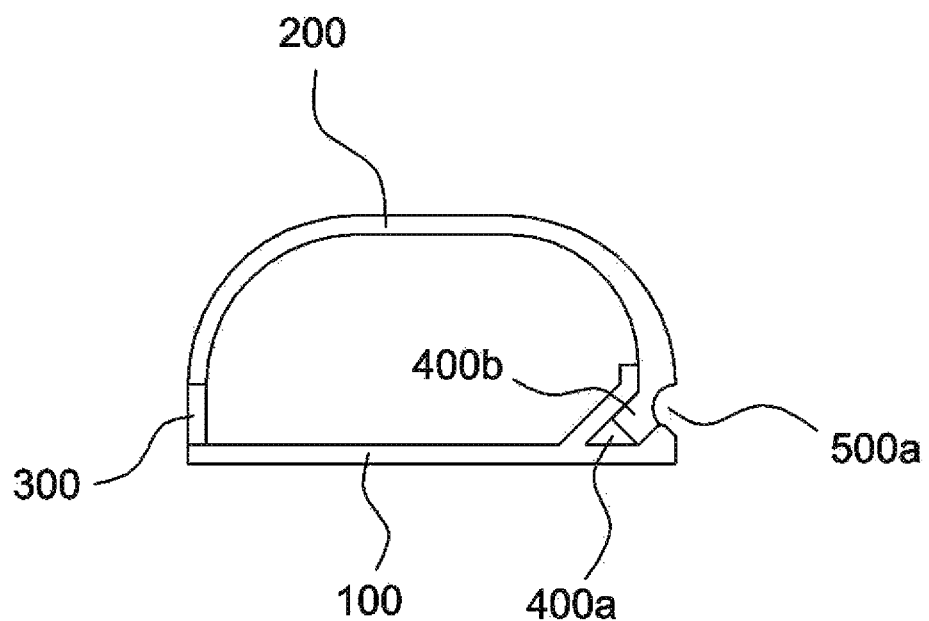

The bottom portion 100 is a portion that is brought into close contact with a floor or a wall and accommodates a cable disposed thereon. In general, the bottom portion is fixed to a floor or a wall by means of a sheet of double-sided adhesive tape adhered to the lower surface thereof, separate screws, or the like. As shown in FIG. 3, the bottom portion 100 may include side walls bent and extending upwards from both side ends thereof. As shown in FIG. 5, the bottom portion 100 may include a side wall bent and extending upwards from one of both side ends thereof. As shown in FIG. 6, the bottom portion 100 may include no side wall.

The cover portion 200 is formed to cover the upper side of the bottom portion to accommodate the cable disposed thereunder. Therefore, the cover portion 200 may be formed in any of various shapes shown in FIG. 3, FIG. 5, and FIG. 6 so as to correspond to the above-described shape of the bottom portion.

The connection portion 300 integrally connects one side end of the bottom portion to one side end of the cover portion to allow the cover portion to be opened and closed about the side end thereof. That is, the bottom portion and the cover portion are integrally formed with each other by means of the connection portion 300, whereby the bottom portion and the cover portion are not separated from each other, and the cover portion is flipped from side to side about the connection portion. As shown in FIG. 3, FIG. 5, or FIG. 6, the connection portion 300 may be formed at an edge portion, an upper portion, a middle portion or a lower portion of the side wall. The connection portion 300 may be made of a soft synthetic resin material so as to be flexibly bent, as shown in FIG. 3, or may be formed in a thin-wall shape through a thickness reduction process.

In one embodiment, as shown in FIGS. 3 and 4, the connection portion 300 is integrally formed with the bottom portion and the cover portion, and is made of a soft synthetic resin material so as to be easily bent. That is, while the bottom portion 100 and the cover portion 200 are made of a synthetic resin material having hard properties, the connection portion 300 is made of a synthetic resin material having soft properties so as to be easily bent. In this case, the connection portion having soft properties is integrally formed with the bottom portion and the cover portion having hard properties through a single process, such as double injection molding or extrusion molding. The degree of flexure and the hardness of the connection portion 300 having soft properties may be freely adjusted in the molding process. Therefore, the connection portion may be formed to be flexible so that the cover portion is easily opened and closed, or may be formed to be stiff so that the cover portion is not opened beyond a predetermined angle.

Figure 1:
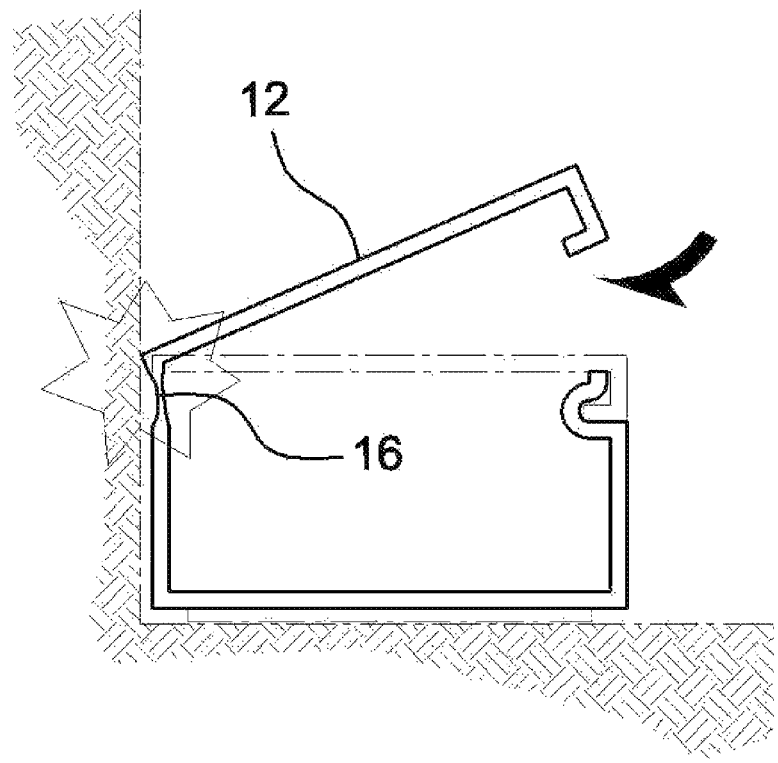
FIG. 1 is a view for explaining a problem with a conventional cable mold.
Figure 7:
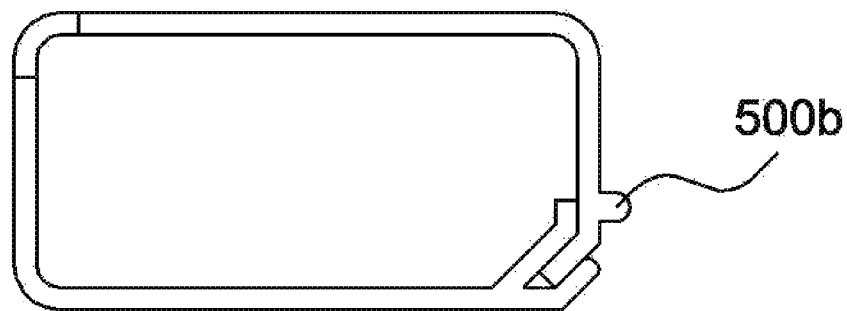
Figure 8:
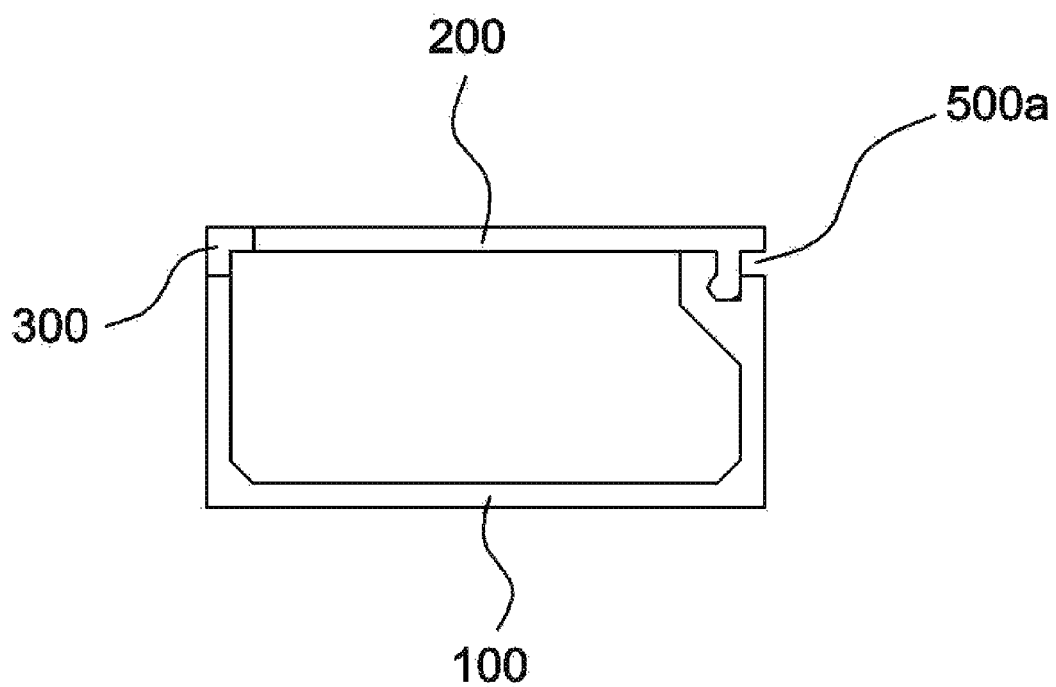

The locking portions 400 include a pair of female and male locking portions respectively formed on the opposite side end of the bottom portion and the opposite side end of the cover portion so as to be coupled to and separated from each other. The locking portions 400 may be formed such that the female and male locking portions are engaged with each other in a vertical direction, as shown in FIGS. 3 and 4, or may be formed such that the female and male locking portions are engaged with each other in an oblique direction, as shown in FIGS. 5 to 7. Alternatively, as shown in FIG. 1, the locking portions 400 may be formed so as to be fastened in a hook-like manner.

Figure 9:
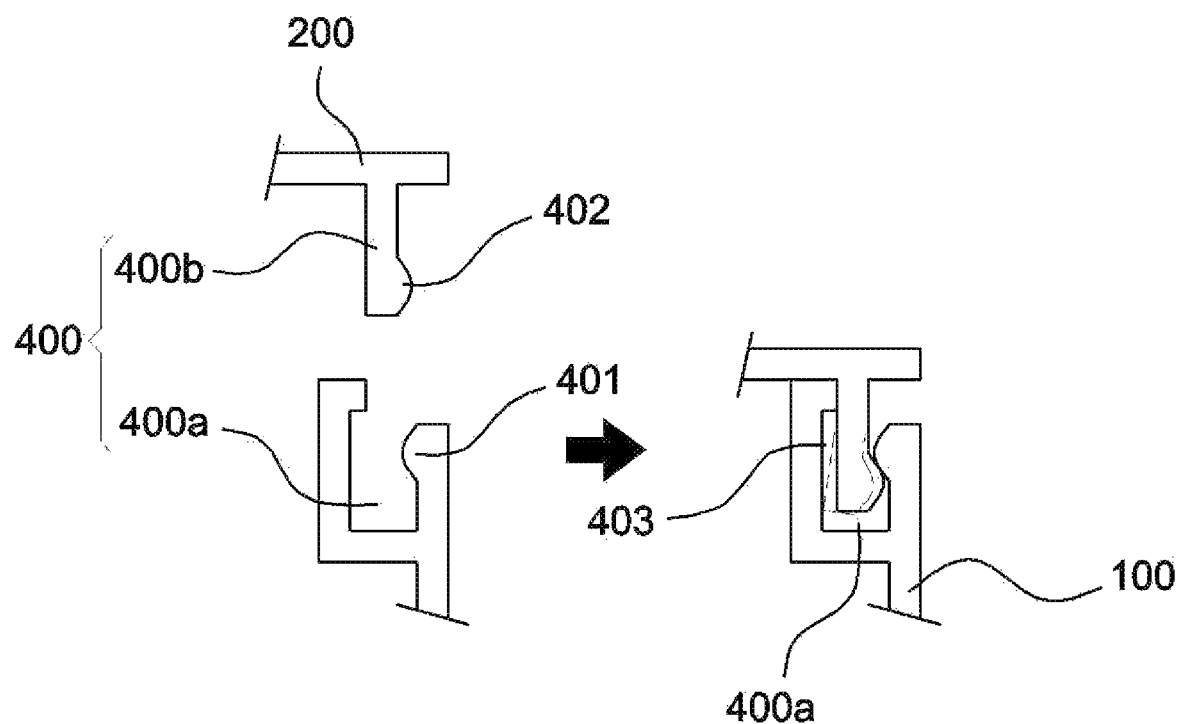

In one embodiment, as shown in FIG. 3, FIG. 4, or FIG. 9, the locking portions 400 include a coupling groove 400a and a coupling protrusion 400b formed corresponding to the coupling groove so as to be fitted thereinto. The coupling groove and the coupling protrusion have snap protrusions 401 and 402 formed on contact surfaces thereof that are brought into close contact with each other, so that the snap protrusions 401 and 402 are caught by each other. In addition, the coupling groove 400a has a clearance space 403 defined therein to allow the coupling protrusion 400b to be pushed thereto when fitted into or separated from the coupling groove 400a. Due to this configuration, since the coupling protrusion is fitted into the coupling groove such that the two corresponding snap protrusions are caught by each other, even when the cover portion is pushed from side to side by the connection portion, the locked state of the cover portion is stably maintained. In addition, when the cover portion is pushed upwards using the opening/closing portion to be described later, the coupling protrusion is pushed to the clearance space, and therefore the snap protrusions are released from each other, whereby the cover portion is conveniently opened.

The opening/closing portion 500a or 500b is formed on the opposite side end of the bottom portion or the opposite side end of the cover portion to enable a user to push the cover portion upwards to open the same. That is, the opening/closing portion 500a or 500b is a portion for opening the cover portion away from the bottom portion, and is formed to enable the user to easily push or pull the cover portion upwards with his/her hands without using a tool. In other words, the opening/closing portion 500a or 500b is formed to enable the user to easily open the cover portion with his/her fingertip or the like.

In one embodiment, as shown in FIGS. 3 to 6, the opening/closing portion 500a may be formed in a shape of a groove depressed in an inward direction. In this case, the opening/closing portion 500a having a groove shape, as shown in FIGS. 3 and 4, may be formed between the bottom portion and the cover portion, specifically above the bottom portion or the locking portions, in order to push the cover portion upwards. Alternatively, the opening/closing portion 500a may be formed at a middle portion of the opposite side surface of the cover portion, as shown in FIG. 5, or may be formed at a lower end of the opposite side surface of the cover portion, as shown in FIG. 6.

In another embodiment, as shown in FIG. 7, the opening/closing portion 500b may be formed in a shape of a protrusion protruding in an outward direction. In this case, the opening/closing portion 500b having a protrusion shape may be selectively formed at an upper portion, a middle portion or a lower portion of the opposite side surface of the cover portion.

According to the above-described cable mold of the present invention, the bottom portion 100 and the cover portion 200 are integrally formed with each other by means of the connection portion 300 formed on one side of the bottom portion and one side of the cover portion, and the closed state of the cover portion is maintained by the locking portions formed on the opposite side of the bottom portion and the opposite side of the cover portion. In addition, the opening/closing portion 500a or 500b formed on the opposite side of the cover portion enables the user to easily open the cover portion by pushing the same with his/her hands whenever he or she wants, thereby further improving use convenience.

Figure 10:
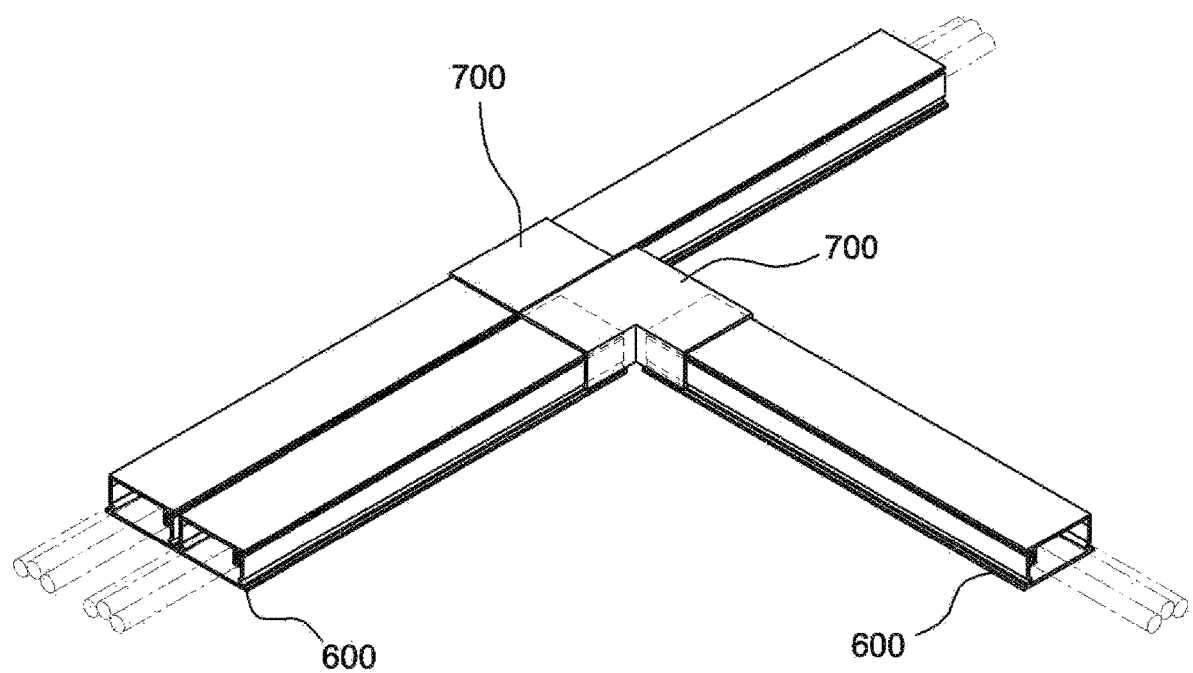
FIG. 10 is a view showing an external appearance of another embodiment of a cable mold to which the present invention is applied.
Figure 11:
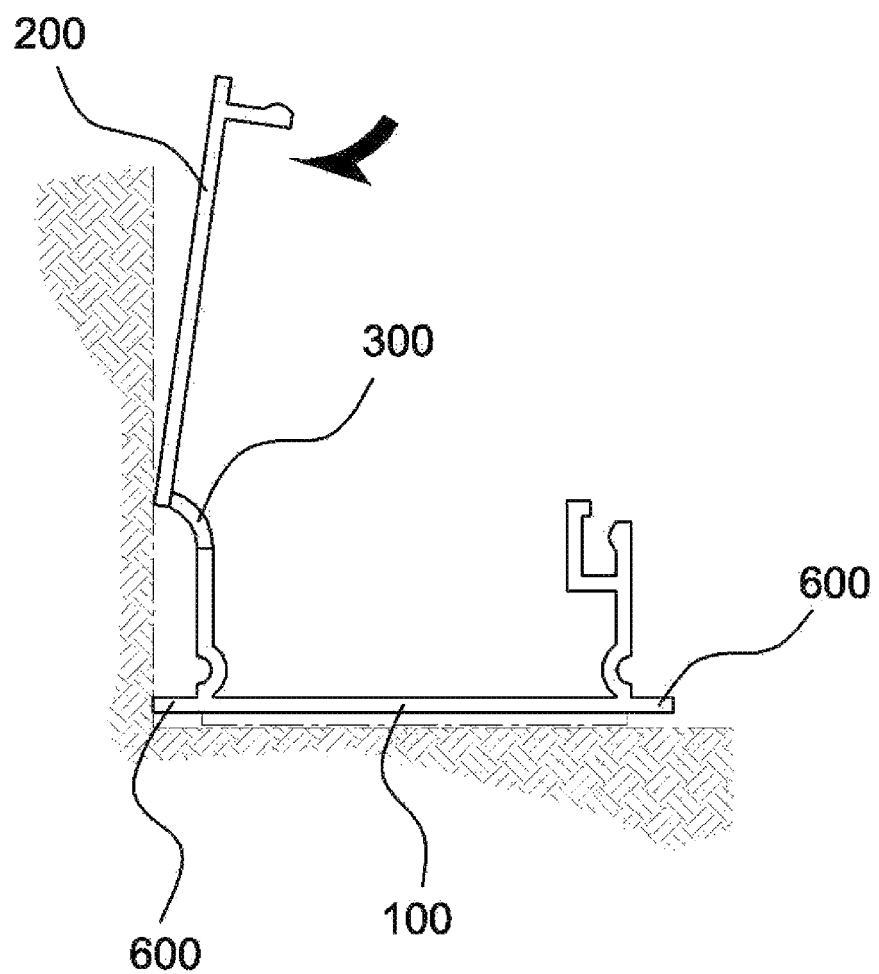
FIGS. 11 and 12 are views for explaining the other embodiment of a cable mold to which the present invention is applied.
Figure 12:
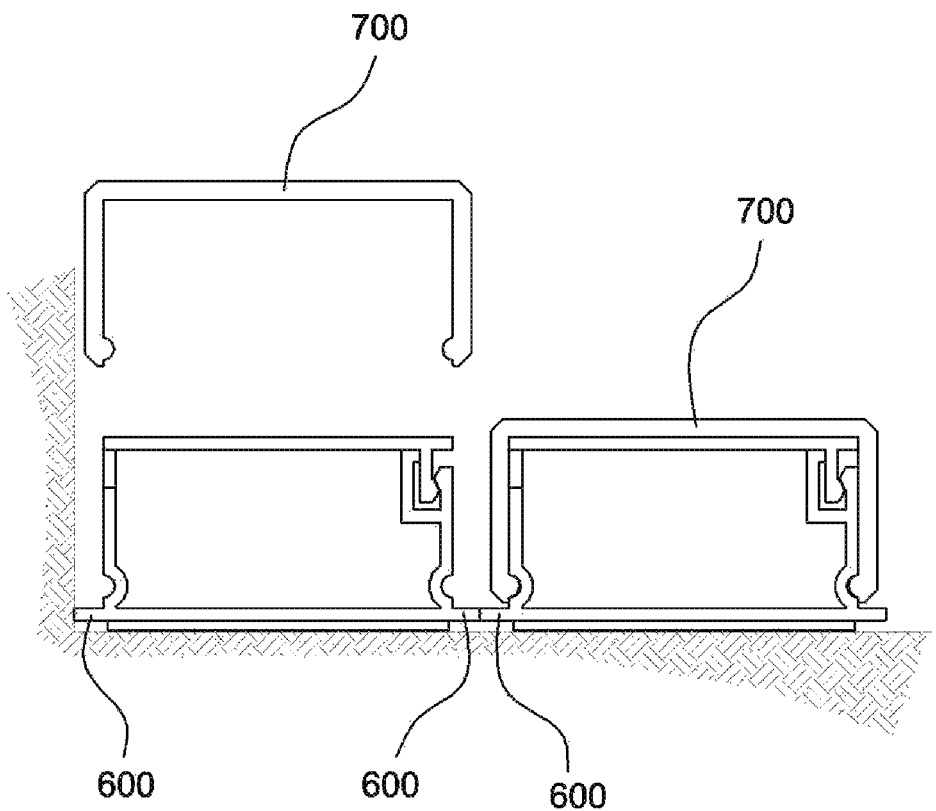
Figure 13:
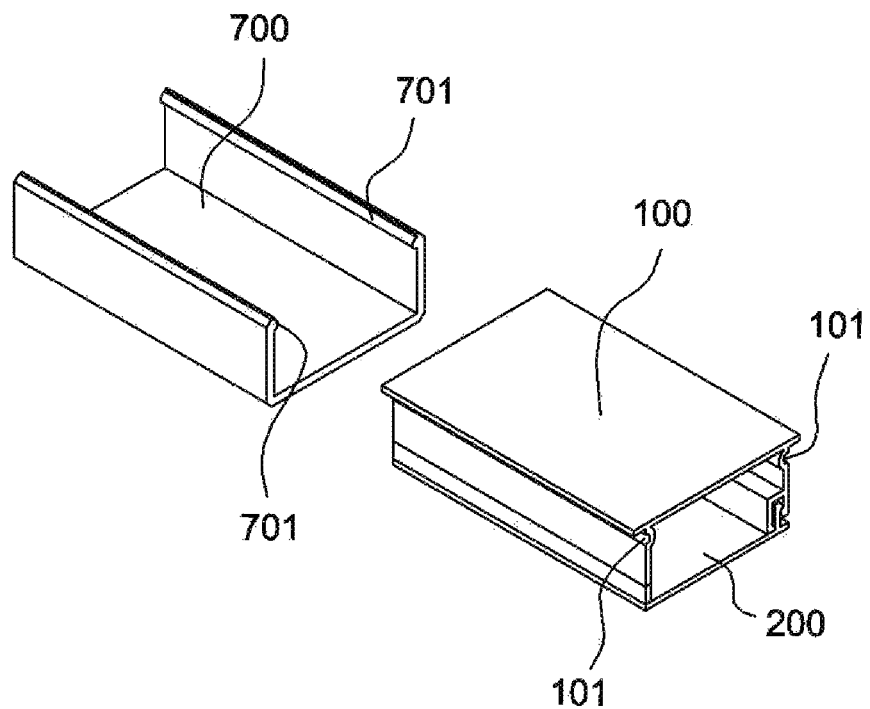
FIG. 13 is a view showing an external appearance of still another embodiment of a cable mold to which the present invention is applied.
Figure 14:
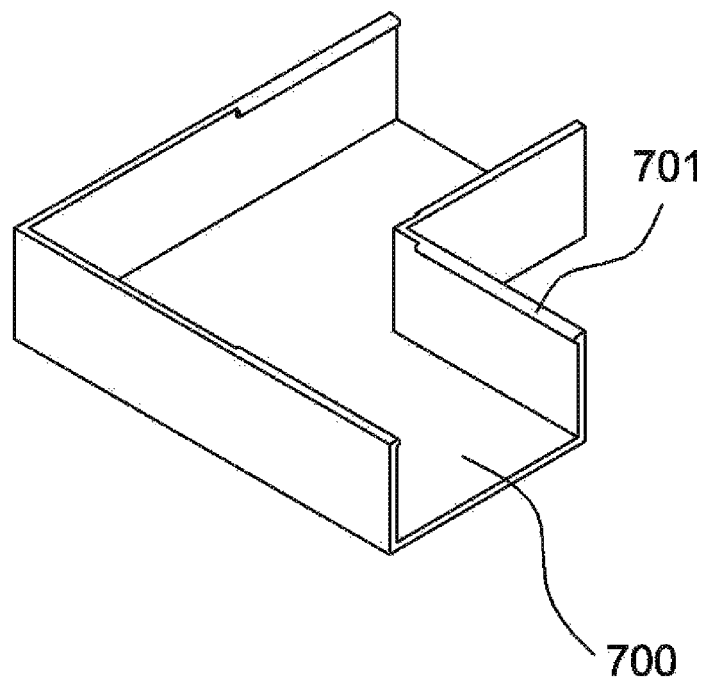
FIGS. 14 to 19 are views illustrating still other embodiments of a cable mold to which the present invention is applied.

As shown in FIGS. 10 to 12, the cable mold of the present invention includes a wing portion 600 formed on each of both sides of the bottom portion, and the wing portion 600 has a predetermined width. For example, as shown in FIG. 11, when the cable mold is mounted on an edge of a floor, the wing portion 600 allows the bottom portion 100 or the cover portion 200 to be spaced a predetermined distance from a wall, thereby facilitating opening and closing of the cover portion 200. As shown in FIG. 10, when two or more cable molds are mounted in parallel, the wing portions 600 of the cable molds allow the side surfaces of the bottom portions adjacent to each other or the side surfaces of the cover portions adjacent to each other to be spaced a predetermined distance from each other, thereby ensuring exposure of the opening/closing portion 500a or 500b and facilitating opening and closing of the cover portion 200.

In addition, as shown in FIG. 12, when the cable mold is mounted on an edge of a floor, the wing portion 600 allows the bottom portion or the cover portion to be spaced a predetermined distance from a wall, thereby facilitating coupling or separation of a connection member 700 to be described later. In addition, when two or more cable molds are mounted in parallel, the wing portions 600 thereof, which have a predetermined width, allow the cable molds adjacent to each other to be spaced a predetermined distance from each other, thereby facilitating coupling or separation of the connection member 700 to be described later. Therefore, for example, the width of the wing portion 600 may be equal to or greater than a predetermined width that allows the connection portion 300 to be bent so that the cover portion 200 stands upright, as shown in FIG. 11, or may be equal to or greater than a predetermined width that allows the connection member 700 to be easily coupled and separated, as shown in FIG. 12.

As shown in FIGS. 10 and 13 to 19, in the cable mold of the present invention, the bottom portion 100 has guide grooves 101 formed in both sides thereof. The cable mold includes a connection member 700 configured to cover both sides of the bottom portion and the cover portion, and the connection member 700 has guide protrusions 701 formed thereon so as to be fitted into the guide grooves.

Figure 15:
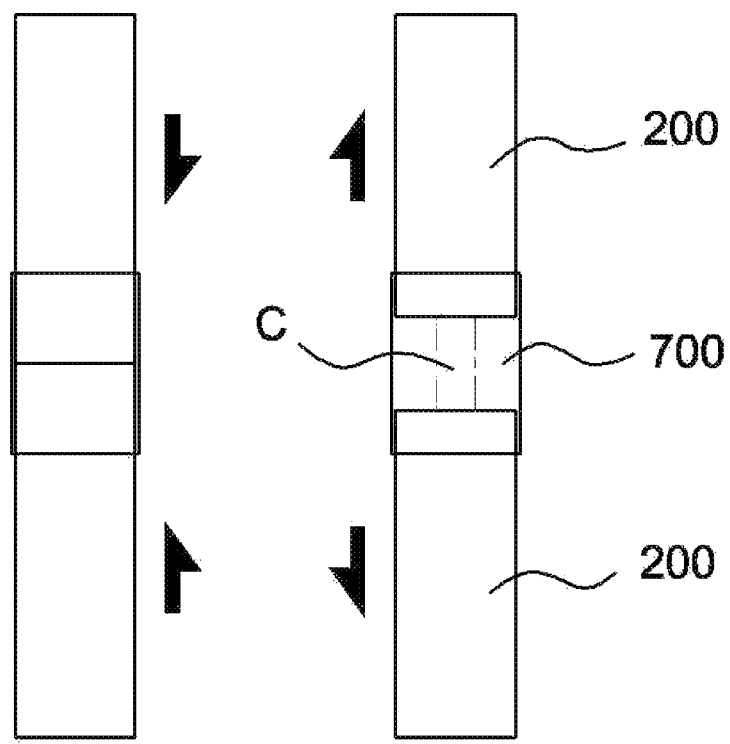
Figure 16:
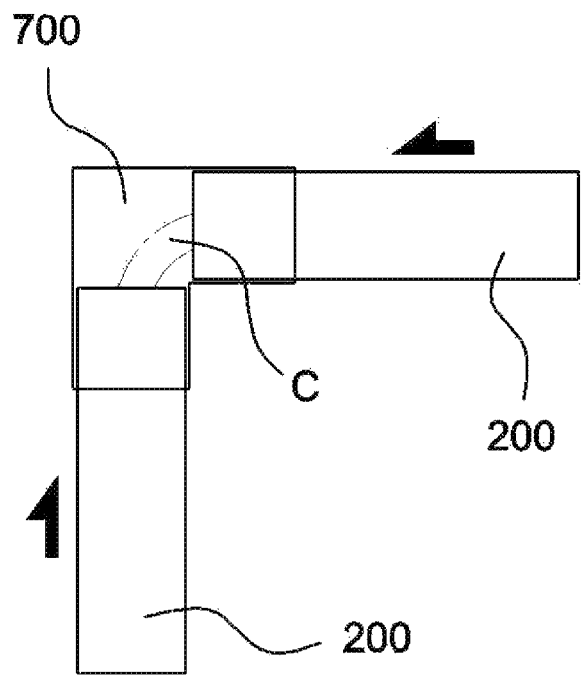
Figure 16:
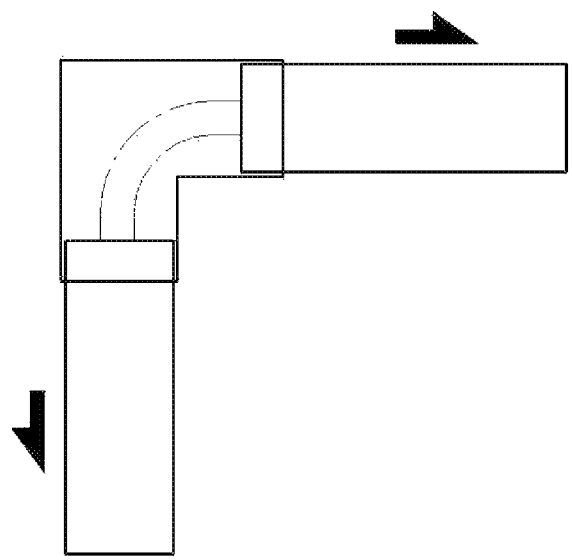

As shown in FIG. 10, when the cable molds having a predetermined length are mounted so as to be connected to each other, the connection member 700 functions to cover a gap between a front end of one cable mold and a rear end of another cable mold, which are disposed so as to be in contact with each other or are disposed at a predetermined angle relative to each other. That is, the connection member 700 functions not only to prevent entry of foreign substances into a gap between ends of the front and rear cable molds, which are disposed so as to be in contact with each other or are disposed at a predetermined angle relative to each other, or exposure of a cable through the gap, but also to improve aesthetics. In addition, as shown in FIGS. 15 and 16, the connection member 700 is formed to have a predetermined length sufficient to cover a gap between ends of the front and rear cable molds even when the ends of the front and rear cable molds are spaced a predetermined distance from each other. That is, the connection member 700 is formed so as to cover a gap within a predetermined range between ends of the front and rear cable molds, which are connected to each other through one end portion or both end portions of the connection member.

Figure 17:
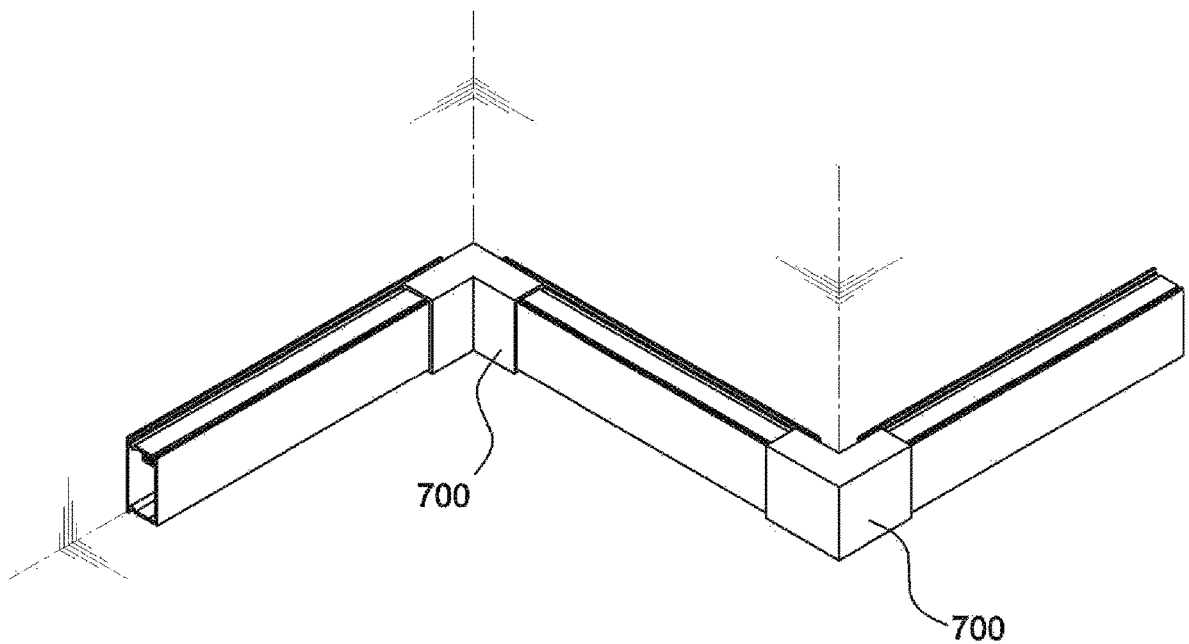

The connection member 700 may be of a bent type, and the bent-type connection member may be implemented as a horizontally-bent-type connection member that is bent in a leftward direction or a rightward direction, as shown in FIG. 16, or a vertically-bent-type connection member that is bent in an upward direction or a downward direction, as shown in FIG. 17, depending on the direction in which the cable molds are mounted.

Figure 18:
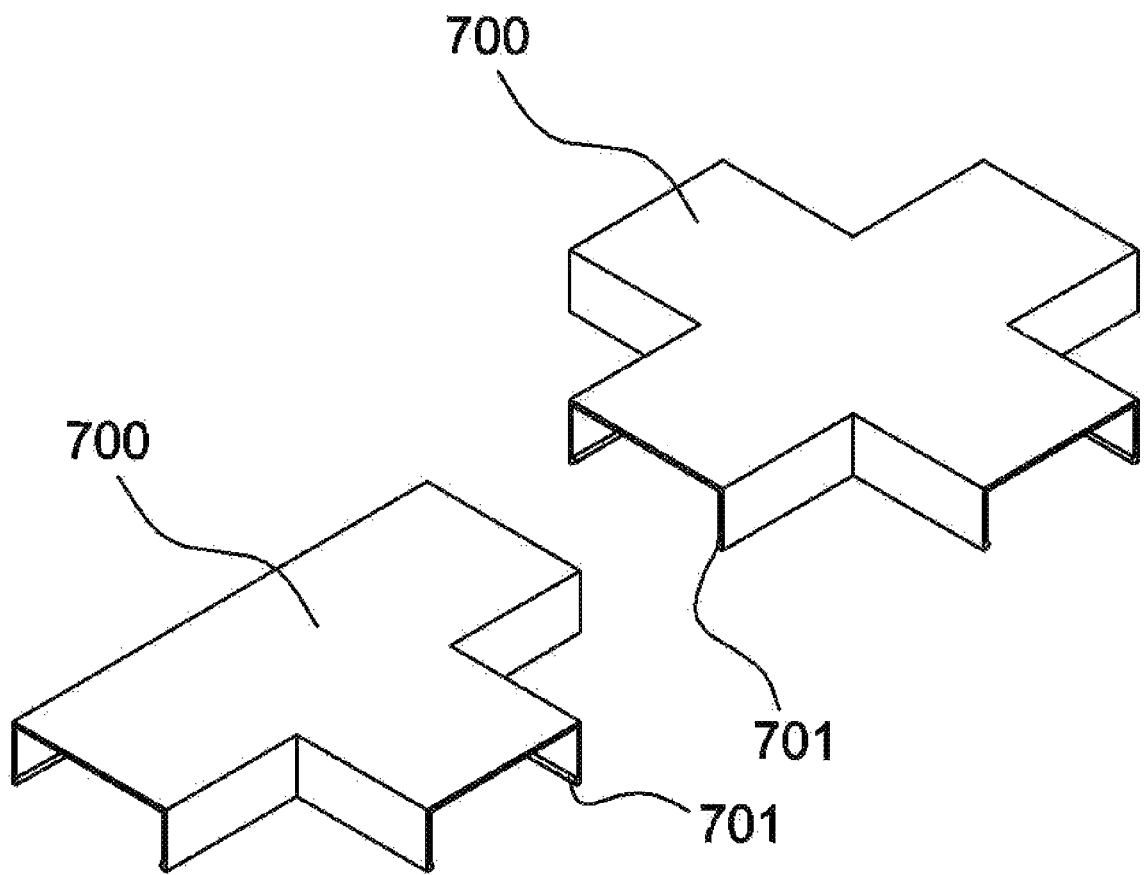

The connection member 700 may be formed to have branch portions that extend in at least three directions selected from among a forward direction, a backward direction, a leftward direction, a rightward direction, an upward direction, and a downward direction. That is, as shown in FIG. 18, the connection member 700 is formed in a "T" shape or a "+" shape.

Figure 19:
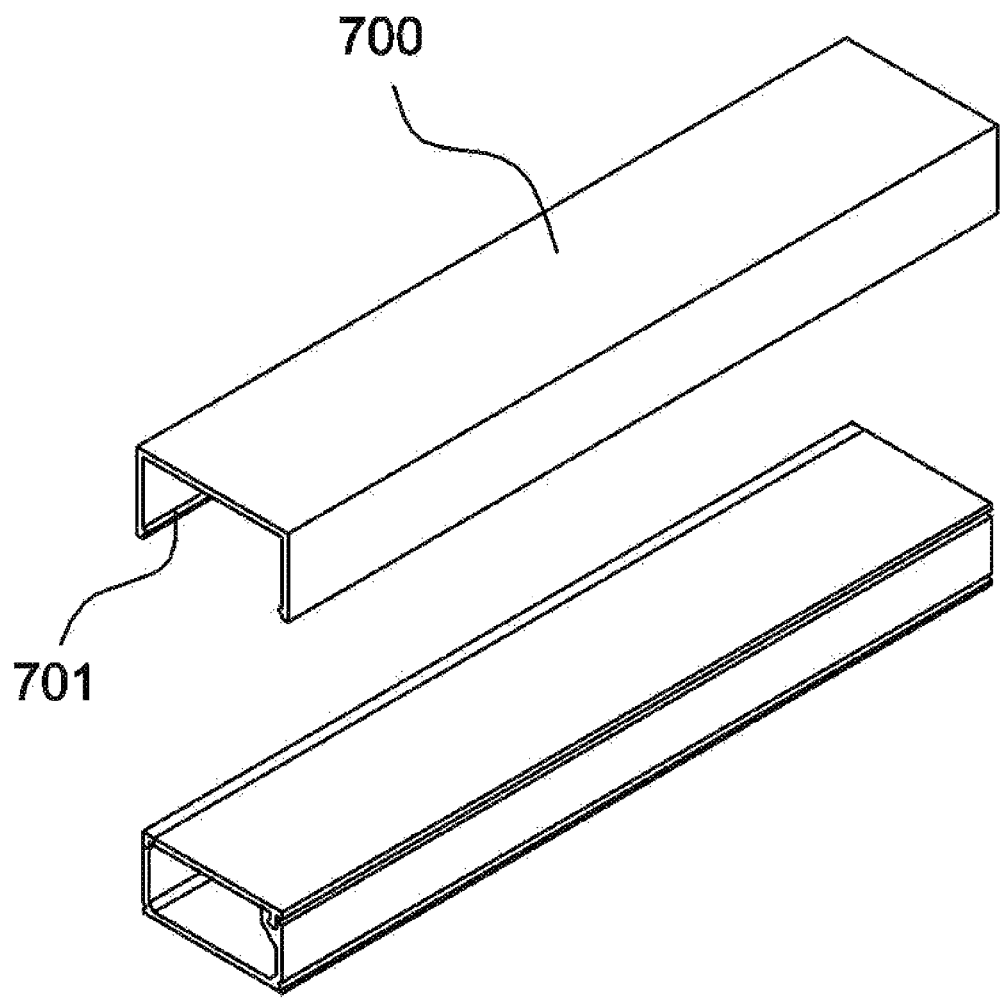

As shown in FIG. 19, the connection member 700 may be formed to be long enough to cover the entire area of the cover portion or the outer surface of the bottom portion. Such a connection member 700 is printed or coated with any of various colors, patterns, or designs.

DESCRIPTION OF REFERENCE NUMERALS

100: bottom portion, 200: cover portion, 300: connection portion, 400: locking portions,
500*a*, 500*b*: opening/closing portion, 600: wing portion, 700: connection member.

What is claimed is:

1. A cable mold comprising:
a base portion configured to be brought into close contact with a floor or a wall;
a cover portion configured to cover an upper side of the base portion to accommodate the cable disposed within a space defined between the base portion and the cover portion;
a connection portion connecting a first side end of the base portion to a first side end of the cover portion, the connection portion formed unitarily with the base portion and the cover portion in one piece and allowing the cover portion to be opened and closed about the connecting portion;
first and second locking portions formed on a second side end of the base portion and a second side end of the cover portion, respectively, so as to be coupled to and separated from each other; and
an opening/closing facilitation portion formed on the second side end of the base portion to enable a user to open or close the cover portion,
wherein one of the first and second locking portions comprises a coupling protrusion member extending in a transverse direction of the cover portion, and the other one of the first and second locking portions comprises a coupling groove member with a generally U-shape groove configured to detachably couple with the coupling protrusion member,
wherein the U-shaped coupling groove member includes a snap protrusion portion extending in a transverse direction of the base portion and configured to catch the coupling protrusion member upon closing of the cover portion to the base portion,
wherein a clearance space is defined in the U-shaped coupling groove so as to allow a distal end of the coupling protrusion member to be elastically bent in a lateral direction within the clearance space and thus enabling an opening and closing operation of the cover portion from and to the base portion as the opening/closing facilitation portion of the cover portion is pushed or pulled toward or away from the U-shaped coupling groove of the base portion by hand.

2. The cable mold according to claim 1, wherein the connection portion is made of a synthetic resin material having soft properties so as to be easily bent.

3. The cable mold according to claim 1, wherein the opening/closing facilitation portion is formed in a shape of a groove depressed in an inward direction or a shape of a protrusion protruding in an outward direction.

4. The cable mold according to claim 1, wherein the base portion comprises a wing portion formed on each of both sides thereof, the wing portion having a predetermined width.

5. The cable mold according to claim 1, wherein the base portion has guide grooves formed in both sides thereof, and the cable mold comprises a connection member configured to cover both sides of the base portion and the cover portion, the connection member having guide protrusions formed on both sides thereof so as to be fitted into the guide grooves.

6. The cable mold according to claim 5, wherein the connection member is formed so as to be bent in a horizontal direction or a vertical direction or to have branch portions extending in at least three directions selected from among a forward direction, a backward direction, a leftward direction, a rightward direction, an upward direction, and a downward direction.

7. The cable mold according to claim 1, wherein the connection portion is formed unitarily with the base portion and the cover portion through a double injection molding or extrusion molding.

* * * * *